DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 21, 1972

896 O.G. 834

T896,046

PAPER MATERIALS IMPREGNATED WITH POLYSILOXANES

Robert J. Vetter, 7 Maple Ave., Richmond, Va. 23226

Filed Apr. 15, 1971, Ser. No. 134,449

Int. Cl. B32b *27/34*

U.S. Cl. 117—138.8 N

No Drawing. 15 Pages Specification

A flexible, coherent sheet material made of fibrids of a non-fusing aromatic polyamide and, optionally, fibers of a non-fusing aromatic polyamide and/or particulate mica, which sheet material is impregnated with a liquid polysiloxane. The sheet materials, which are paper-like, are useful for electrical insulation purposes, especially where high temperatures are encountered. The material contains 10 to 100 parts by weight of the fibrids, 0 to 50 parts by weight of the fibers, 0 to 90 parts of the mica and 1 to 70% of the polysiloxane. The polysiloxane has the formula

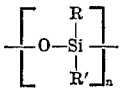

where R is hydrocarbon, R′ is hydrogen or hydrocarbon, $n$ is at least 10, and the molecule is endcapped with hydroxyl, ester or trimethylsiloxy groups.